United States Patent
Sukhomlinov et al.

(10) Patent No.: US 10,509,912 B2
(45) Date of Patent: Dec. 17, 2019

(54) PRIVACY ASSEMBLY FOR IMAGE CAPTURE DEVICE

(71) Applicant: INTEL CORPORATION, Santa Clara, CA (US)

(72) Inventors: Vadim Sukhomlinov, Santa Clara, CA (US); Tamir Damian Munafo, Naale (IL); Kshitij Doshi, Tempe, AZ (US)

(73) Assignee: INTEL CORPORATION, Santa Clara, CA (US)

(*) Notice: Subject to any disclaimer, the term of this patent is extended or adjusted under 35 U.S.C. 154(b) by 16 days.

(21) Appl. No.: 15/855,791

(22) Filed: Dec. 27, 2017

(65) Prior Publication Data

US 2019/0042769 A1 Feb. 7, 2019

(51) Int. Cl.

| G06F 21/60 | (2013.01) |
|---|---|
| G06F 21/62 | (2013.01) |
| H04N 5/235 | (2006.01) |
| H04N 5/238 | (2006.01) |
| G06F 21/83 | (2013.01) |
| H04N 5/225 | (2006.01) |
| H04N 5/232 | (2006.01) |

(52) U.S. Cl.
CPC ........ *G06F 21/604* (2013.01); *G06F 21/6245* (2013.01); *G06F 21/83* (2013.01); *H04N 5/2254* (2013.01); *H04N 5/232* (2013.01); *H04N 5/238* (2013.01); *H04N 5/2354* (2013.01)

(58) Field of Classification Search
CPC ... G06F 21/604; G06F 21/6245; H04N 5/238; H04N 5/2354
See application file for complete search history.

(56) References Cited

U.S. PATENT DOCUMENTS

| 2006/0077279 A1* | 4/2006 | Kang ................. G02B 13/0075 348/335 |
| 2010/0026817 A1* | 2/2010 | Ryan ................... G06F 19/3418 348/207.11 |
| 2015/0009398 A1* | 1/2015 | Shih ...................... H04N 5/2354 348/370 |
| 2016/0266472 A1* | 9/2016 | Terry ................... H04N 5/2252 |

OTHER PUBLICATIONS

Kathirgamanathan et al., "Electroluminescent Organic and Quantum Dot LEDs: The State of the Art", Journal of Display Technology, vol. 11, Issue: 5, May 2015, retrieved from <http://ieeexplore.ieee.org/document/7073586/?reload=true>, 23 pages.
"Smart tint", retrieved from <http://www.smarttint.com/>, copyright 1999, 12 pages.

\* cited by examiner

*Primary Examiner* — Gevell V Selby

(57) ABSTRACT

Techniques and apparatus for preventing unauthorized use of an image capture device are described. In one embodiment, for example, an apparatus may include an image capture unit operative to capture images from incident light incident on at least a portion of the image capture unit, a privacy assembly operative to prevent the image capture unit from generating a clear image responsive to a privacy active signal, and logic coupled to the privacy assembly, the logic to generate the privacy active signal responsive to the image capture unit being inactive. Other embodiments are described and claimed.

22 Claims, 8 Drawing Sheets

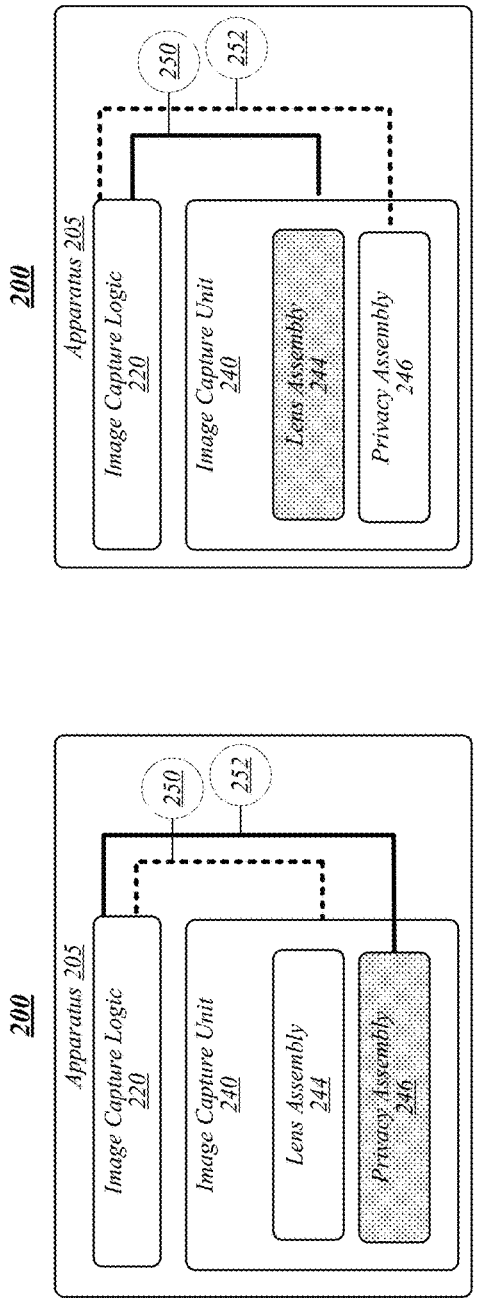
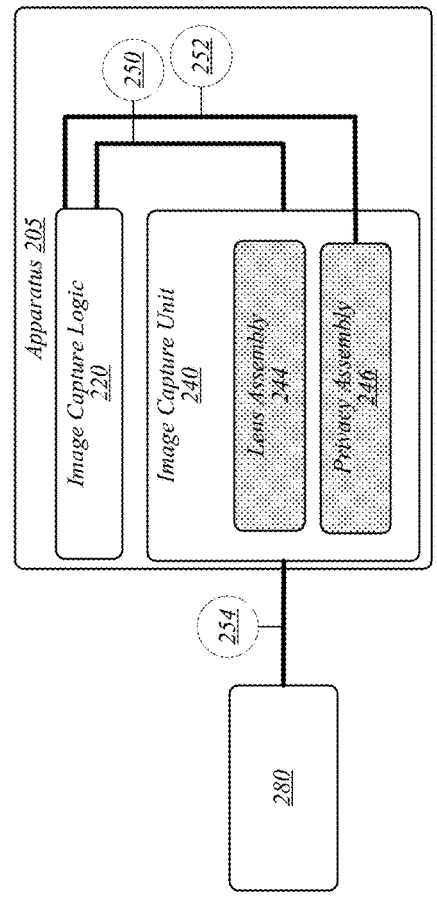
FIG. 2A
FIG. 2B
FIG. 2C

PRIVACY ASSEMBLY FOR IMAGE CAPTURE DEVICE

TECHNICAL FIELD

Embodiments herein generally relate to image capturing devices, and more particularly, to providing a privacy assembly to prevent unintentional or unauthorized image capture by an image capturing device.

BACKGROUND

Software-controlled cameras have become a ubiquitous part of the public space (for example, surveillance cameras) as well as consumer's private lives (for example, device-integrated cameras). However, they are also vulnerable to malicious software designed to take unauthorized control to obtain data or images. In addition, the camera owner is typically initially unaware that their device has been compromised. Conventional techniques to thwart unauthorized control of cameras have been ineffective for multiple reasons, including users intentionally or inadvertently disengaging protection mechanisms (for instance, latches or covers) and malware detection software being out of date or circumvented by hackers.

BRIEF DESCRIPTION OF THE DRAWINGS

FIGS. 2A-C illustrate an embodiment of a second operating environment.

DETAILED DESCRIPTION

Figure 1:
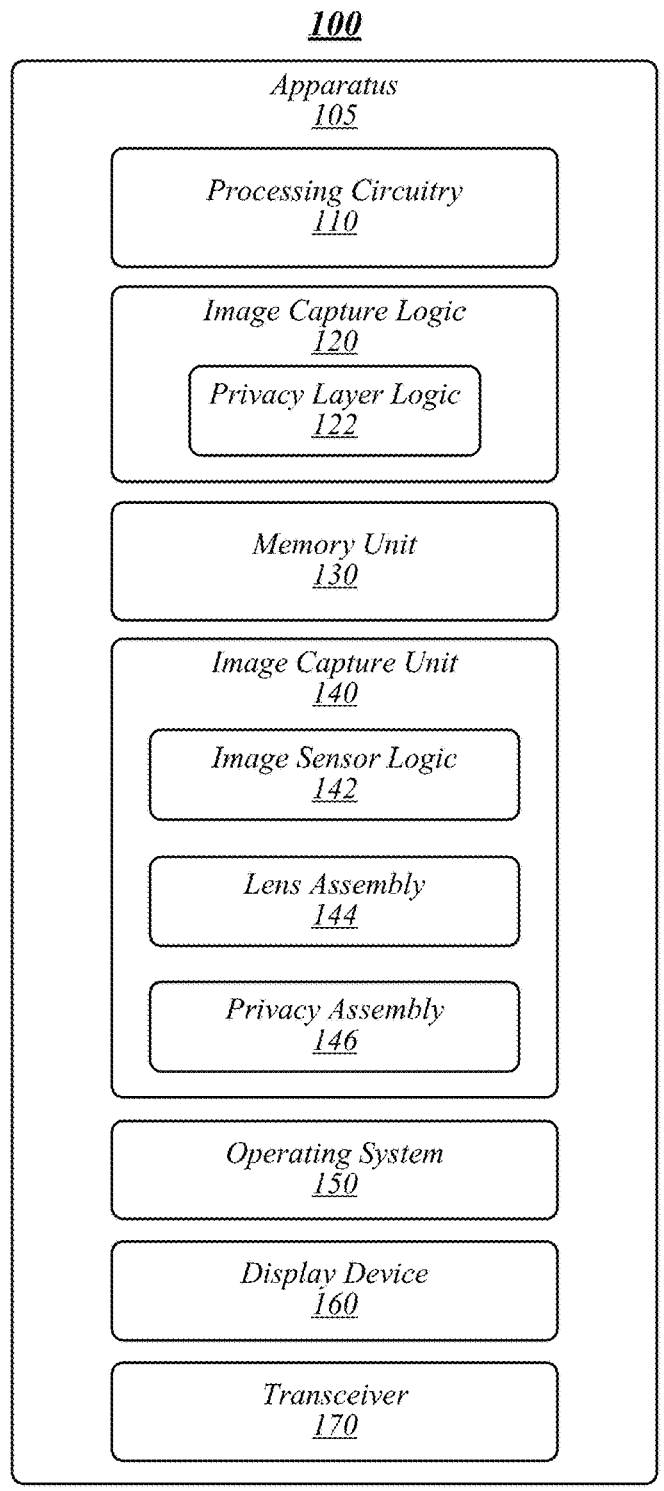
FIG. 1 illustrates an embodiment of a first operating environment.

Various embodiments may be generally directed to image capture devices that include a privacy layer operative to prevent unauthorized images from being captured by an image capture device. Non-limiting examples of image capture devices may include still-image cameras, video cameras, or combinations thereof. An image capture device may be an integrated camera (for instance, embedded in a smartphone, laptop, or other computing device) or a stand-alone camera (for instance, a software-controlled camera, a "web cam," a "nanny cam," a baby monitor camera, a surveillance camera, and/or the like). In some embodiments, the privacy layer may be activated to screen, blur, distort, or otherwise block the lens of an image capture device. In various embodiments, the privacy layer may be activated responsive to the image capture device being deactivated by a user, for example, via software controlling the image capture device. In some embodiments, the privacy layer may be activated/deactivated by an operating system (OS) of a computing device. In other embodiments, the privacy layer may be activated/deactivated by software operating on a computing device through an authorized channel, such as a user selection via an image capture device user interface.

The privacy layer may be deactivated to allow the lens of an image capture device to capture images. In exemplary embodiments, the privacy layer may be deactivated responsive to the image capture device being activated through an authorized process, such as activating the image capture device via software controlling the image capture device. Accordingly, if an image capture device is activated via an unauthorized process, such as malware, the privacy layer will remain active and the lens will be blocked, preventing the capture of images by the image capture device.

Advances in technology have allowed for cameras to be integrated into a wide range of devices, including phones, computing devices, automobiles, and/or the like. Moreover, stand-alone cameras are being used in more public and private spaces for surveillance and other monitoring purposes. While the ease of use and proliferation of cameras has allowed users to capture more images, their ubiquity also makes users vulnerable to misuse of their computing devices via the integrated cameras. Certain conventional cameras have an indicate which indicates camera activity, such as a red-light indicator when capturing video, to visualize on/off state (for instance, a camcorder or digital single-lens reflective (DSLR) camera). However, many cameras, particularly those integrated into computing devices, do not have a dedicated hardware on/off indicator (relying instead on a graphical user interface (GUI) indicator on a software interface). In addition, malicious software is capable of operating a camera while disabling any on/off indicators. Accordingly, malicious software is capable of capturing images without being detected by a user.

Conventional techniques to prevent unauthorized or unintended use of an image capture device have typically included mechanical covering means, anti-malware software, or physical on/off switches (as opposed to software-based activation). However, such conventional approaches have failed for various reasons. For example, mechanical covering means may include physical latches that cover the camera lens. Some users have also used objects, such as tape or paper, to cover camera lenses that do not have a physical mechanism. However, such solutions are not aesthetically appealing and are often not practical for certain form factors (for instance, smartphones and tablet computing devices). In addition, they are generally not sufficiently effective as users typically intentionally or inadvertently omit using them to cover the camera lens. Anti-malware software has proven to be an unreliable solution as it is typically not up to date on most computing devices, and its effective use depends on user sophistication, version capabilities, and many other factors that lead to gaps in identification and intervention. In another example, certain manufacturers have included a control that requires a user to perform a specific activation/deactivation step to physically enable/disable a camera device. However, similar to the mechanical covering means, users often intentionally or inadvertently leave the camera enabled, leaving the camera vulnerable to exploitation by malicious software.

Accordingly, some embodiments provide a privacy layer for image capture devices that does not rely on direct user intervention and that will prevent an image capturing device from capturing visible images even if the image capturing device is under control of malicious software. In addition, a privacy layer according to some embodiments may provide a privacy indicator operative to indicate to a user that the privacy layer is active and the image capture device is blocked from capturing images.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of various embodiments. The operating environment 100 depicted in FIG. 1 may include an apparatus 105 having a processing circuitry 110, an image capture logic 120, a memory unit 130, an image capture unit 140, a display device 160, and a transceiver 170. Apparatus 105 may be or may include a computing device, such as a laptop computer, a personal computer (PC), a workstation computer, a tablet, a personal digital assistant (PDA), a smartphone, a phablet, an image capture device, a server, a networking device, and/or the like.

Processing circuitry 110 may be communicatively coupled to image capture logic 120, memory unit 130, image capture unit 140, display device 160, and transceiver 170. In various embodiments, processing circuitry 110 may include a central processing unit (CPU) and/or may be implemented on or as a system-on-a-chip (SoC). Processing circuitry 110 may include and/or may access various logic for performing processes according to some embodiments. For instance, processing circuitry 110 may include and/or may access image capture logic 120, privacy layer logic 122, and/or image sensor logic 142. Although FIG. 1 depicts image capture logic 120 and/or image sensor logic 142, and/or logic or controllers thereof (for instance, privacy layer logic 122) as separate logic structures, embodiments are not so limited, as image capture logic 120 and/or image sensor logic 142, and/or logic or controllers thereof may be configured as one or a plurality of logic structures.

In addition, image capture logic 120 and/or image sensor logic 142, and/or logic or controllers thereof may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 800. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

In some embodiments, image capture logic 120 and/or image sensor logic 142, and/or logic or controllers thereof may be arranged within processing circuitry 110; however, embodiments are not so limited. For example, image capture logic 120 and/or image sensor logic 142, and/or logic or controllers thereof may be located within an accelerator, a processor core, an interface, an individual processor die, a logic circuit, and/or the like and may include other components, such as software, firmware, circuitry and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, Memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

In some embodiments, image capture logic 120 may control the operational functions of image capture unit 140, including the capturing of images. Image capture unit 140 may include various types of image capture elements operative to capture images, such as a still-image camera, a video camera, and/or the like. For example, apparatus 105 may include a smartphone and image capture unit 140 may include a camera capable of capturing digital still-images and/or digital video. Embodiments are not limited in this regard. In various embodiments, image capture logic 120 may implement or interact with an image capture application (for example, a software application, a mobile application (or "app"), and/or the like) having a user interface displayed via display device 160. The image capture application may be operative to provide access to various aspects of the image capture unit 140, such as settings, preferences, files (for instance, digital images and/or digital videos), and/or the like.

In exemplary embodiments, processing circuitry 110 may execute an operating system (OS) 150 configured to manage the hardware and software of apparatus 105. OS 150 may control various aspects of image capture unit 140, such as whether image capture unit 140 is activated. OS 150 may control image capture unit 140 in conjunction with image capture logic 120. For example, OS 150 may receive input to activate image capture unit 140 via an input device of apparatus 105 (for instance, touchscreen, mouse input, keyboard input, voice input, button input, and/or the like). OS 150 may activate (and/or power-on if not already powered) image capture unit 140 and/or provide an activation signal to image capture logic 120 to activate image capture unit 140. OS 150 may then pass off control of image capture unit 140 to image capture logic 120. In general, activation of image capture unit 140 may include putting image capture unit 140 into an active state where image capture unit 140 is ready and able to capture images responsive to a capture image or record instruction. For example, an activated image capture unit 140 may be powered on and able to present images in its field of view to a user, for instance, via a user interface of image capture application. Image capture unit 140 may also enter an image capture active state in which image capture unit 140 is actively capturing still images and/or video. Image capture logic 120 and/or OS 150 may track the various states of image capture unit, such as the active state, the image capture active state, and/or the like.

In some embodiments, image capture logic 120 may control operation of image capture unit 140 via physical buttons located on the apparatus 105 and/or through virtual software-implemented buttons presented through the image capture application. In various embodiments, image capture logic 120 may control activation of image capture unit 140. For example, apparatus 105 may be a smartphone having multiple image capture units 140 in the form of front and back digital cameras. A user may activate one of the digital cameras by launching the image capture application. In the active state, the image capture application may present the field of view of the digital camera via display device 160. In another example, apparatus 105 may be a stand-alone surveillance device having an image capture unit 140 in the form of a digital camera, such as the Nest® Cam Indoor produced by Nest® of Palo Alto, Calif. The stand-alone surveillance device may include a physical button to activate image capture unit. In addition, apparatus 105 may be operably coupled to a computing device executing the image capture application that provides a GUI object for remotely activating the image capture unit.

In some embodiments, image capture logic 120 and/or OS 150 may set an image capture unit active value or signal responsive to image capture unit 140 being activated via image capture logic 120. For example, image capture value may be set to true, 1, or any other value indicating that image capture unit 140 has been properly activated via an authorized channel, such as selecting a physical button and/or input via the image capture application through apparatus 105. In various embodiments, image capture logic 120 and/or OS 150 may reset the image capture unit active value responsive to image capture unit 140 being deactivated via image capture logic. For example, image capture unit active value may be set to false, 0, or any other value indicating that image capture unit 140 has been deactivated. In some embodiments, the image capture unit active value may be used only to indicate that image capture unit 140 is powered on and active. In other embodiments, the image capture unit active value may indicate that image capture unit 140 is capturing images. In various embodiments, a separate image capturing value or signal may be used to indicate that image capture unit 140 is capturing images.

In various embodiments, image capture unit 140 may be activated improperly (for instance, via malware). For example, image capture unit 140 is powered on and active to capture images, but was not activated via a proper channel (for instance, the image capture unit active value is false). Accordingly, in exemplary embodiments, image capture logic 120 may set an unauthorized active value or signal (for instance, to true, 1, and/or the like) responsive to determining that image capture unit 140 has been activated improperly. In some embodiments, privacy assembly 146 may be left active, as it may be deactivated when image capture unit 140 is activated via an authorized channel. In various embodiments, activation of image capture unit 140 via an authorized channel may be implemented, for example, in hardware, such that activation of image capture unit 140 is mutually exclusive to activation of privacy assembly 146. For example, either image capture unit 140 is active and privacy assembly 146 is inactive, or vice versa.

Image capture unit 140 may include various components to facilitate capturing images (for instance, still images or video). In various embodiments, image capture unit 140 may include a lens assembly 144 operative to receive light external to apparatus 105. Lens assembly 144 may include an optical lens or lens assembly operative to format light incident on lens assembly 144 and to provide the formatted light to image sensor logic 142. Image sensor logic 142 may include various types of digital image sensors, including, without limitation, a charge coupled device (CCD) image sensor, a complementary metal-oxide-semiconductor (CMOS) image sensor, and/or the like. Image sensor logic 142 processes the light provided by lens assembly 144 to generate an image, for example, in the form of a digital image or video file.

Privacy assembly 146 may be operative to prevent image capture unit 140 from capturing images. In particular, privacy assembly 146 may be operative to prevent unauthorized images from being captured by image capture unit 140. In various embodiments, privacy assembly 146 may operate to prevent all or some incident light external to apparatus 105 from reaching lens assembly 144. In some embodiments, privacy assembly 146 may operate to generate light (for instance, "blinding light") that is incident on lens assembly 144 and, ultimately, is received by image sensor logic 142. The blinding light may operate to prevent image capture device 140 from taking clear images, for example, by causing any image produced by image sensor logic 142 to be obscured or otherwise indecipherable (for instance, oversaturated or "washed out" with light). In various embodiments, privacy assembly 146 may be arranged between lens assembly 144 and light incident on lens assembly 144.

Figure 4:
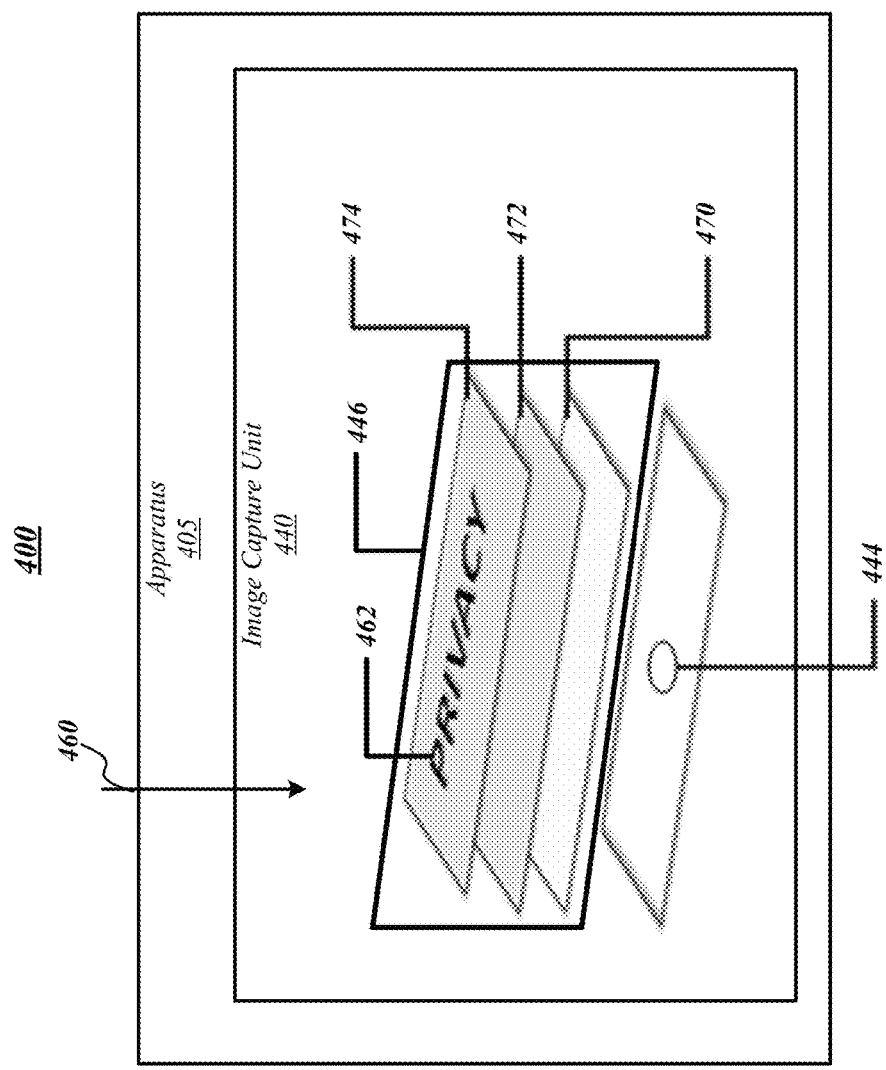
FIG. 4 illustrates an embodiment of a fourth operating environment.

In various embodiments, privacy assembly 146 may include various components to block lens assembly 144 from capturing clear images and/or to present information to a user (see, for example, FIG. 4). In some embodiments, privacy assembly 146 may include a blinding layer (or lighting layer, blocking layer, backlit layer, or the like) configured to generate light that may be incident on lens assembly 144. For example, the blinding layer may include a material or device configured to emit light in response to a stimulus, such as a signal, a current, a voltage, and/or the like. In various embodiments, the stimulus may include lack of a signal, current, voltage, and/or the like. In exemplary embodiments, the blinding layer may include one or more layers of light emitting diodes (LEDs) and/or liquid crystals formed, for instance, as a liquid crystal display (LCD), a polymer-dispersed LCD (PDLC), and/or the like.

In some embodiments, privacy assembly 146 may include a transparency layer. The transparency layer may operate as an optical barrier and/or a light dimmer. In exemplary embodiments, the transparency layer may include a variable-transmissivity material configured to modify the ability of light to be transmitted through the transparency layer (i.e., transmissivity). The variable-transmissivity material may modify the transmissivity of the transparency layer responsive to an application of a stimulus, such as a signal, a current, a voltage, and/or the like. In various embodiments, the stimulus may include lack of a signal, current, voltage, and/or the like.

Privacy assembly 146 may include an information layer according to some embodiments. The information layer may operate to facilitate the display of privacy information relating to the privacy layer assembly, such as a term (for instance, "privacy," "privacy system activated," a logo, a symbol, a color, and/or the like). In some embodiments, the privacy information may include privacy active information operative to signal to a user that privacy assembly 146 is actively blocking image capture device 140 from capturing clear images. In various embodiments, the privacy information may include unauthorized activity information operative to indicate potential unauthorized activity associated with image capture device 140 (for instance, indicating that image capture device 140 is active and privacy assembly 146 is active).

In exemplary embodiments, privacy assembly 146 and components thereof may be transparent responsive to image capture device 140 being properly operated by a user of apparatus 105. Accordingly, privacy assembly 146 does not interfere with regular, authorized camera use. Privacy assembly 146 may operate as a filter by filtering and/or blocking light entering image capture device that is or would be incident on lens assembly 144.

FIG. 2A, FIG. 2B, and FIG. 2C illustrate an example of an operating environment 200 that may be representative of various embodiments. The operating environment 200 depicted in FIG. 2A includes an apparatus 205 having image capture logic 220 and image capture unit 240. Lens assembly 244 and privacy assembly 246 may be arranged within image capture unit 240.

In FIG. 2A, image capture unit 240 is off or otherwise inactive (for instance, a user of apparatus 205 is not engaged in capturing images using image capture unit 240). Accordingly, an image capture unit active signal 250 is low, 0, false, off, or otherwise in a state indicating that image capture unit 240 is inactive. A privacy active signal 252 has been set to high, 1, true, on, or otherwise in a state indicating that privacy assembly 246 is active responsive to, for example, image capture unit 240 being active. In the configuration depicted in FIG. 2A, privacy assembly 246 may operate to blinding and/or blocking lens assembly 244, for example, by emitting light incident on lens assembly and/or preventing incident light from outside of apparatus 205 from reaching lens assembly. In some embodiments, an active privacy assembly 146 may be operative to display an image or otherwise indicate with light emitted by a backlit layer (see, for example, FIG. 4 and FIGS. 5A-C) that it is active, and thus camera cannot capture clear, meaningful images.

In some embodiments, the form of privacy active signal 252 may be determined based on the materials used in privacy assembly 246. For example, a transparency layer may be transparent responsive to application of a voltage and non-transparent when no voltage is being applied. In this example, a high privacy active signal 252 may be the absence of an applied voltage (or other signal), and a low privacy active signal 252 may be the presence of an applied voltage (or other signal). In some embodiments, image capture unit active signal 250 (for instance, a voltage) may be the same or on the same line or signal path as privacy active signal 252, such that application of a voltage to operate image capture device 240 may also cause privacy layer assembly to be transparent and/or to stop emitting light. Embodiments are not limited in this regard.

Referring to FIG. 2B, image capture unit active signal 250 is high, indicating that image capture device 240 has been activated properly by a user of apparatus 205. In response, privacy active signal 252 may be set to low to deactivate privacy assembly 246. In the configuration depicted in FIG. 2B, privacy assembly 246 may be transparent and/or not emitting light to allow light external from apparatus 205 to be incident on lens assembly 244 and/or to not otherwise interfere with light external from apparatus 205 incident on lens assembly. Accordingly, image capture unit 240 may capture clear images. In some embodiments, lens assembly 244 may be active (for instance, when focus distance or other characteristics may be adjusted) or passive (for instance, with a fixed focus or other fixed characteristics). In various embodiments, an image may be captured by an image sensor (not shown), which is part of lens assembly 244, but controlled by image capture unit logic 220.

In FIG. 2C, an unauthorized entity 280 has accessed apparatus 205 via connection 254. For example, unauthorized entity 280 may be a computing device, software, and/or the like. Unauthorized entity 280 may be malicious software installed on apparatus 205 that has taken control of and activated image capture unit 240 without authorization. Accordingly, image capture unit active signal 250 may be set to high, activating image capture unit 240. However, an unauthorized active signal may be high indicating unauthorized operation of image capture unit 240. For example, the unauthorized active signal may be set to high responsive to an OS of apparatus 205 and/or image capture logic 220 determining that image capture unit 240 was not activated by a user through proper channels (for instance, using an input device via a software interface for image capture unit 240). As shown in FIG. 2C, privacy active signal 252 is also high, such that privacy assembly 246 may prevent image capture unit 240 from capturing clear images. In exemplary embodiments, if an attacker attempts to use an authorized channel to disable privacy assembly 246, this will result in the condition depicted in FIG. 2A and a privacy indicator (see, for example, FIGS. 5A-5C) will not be displayed to the user, thus revealing active image capture unit 240 operation.

Figure 3A:
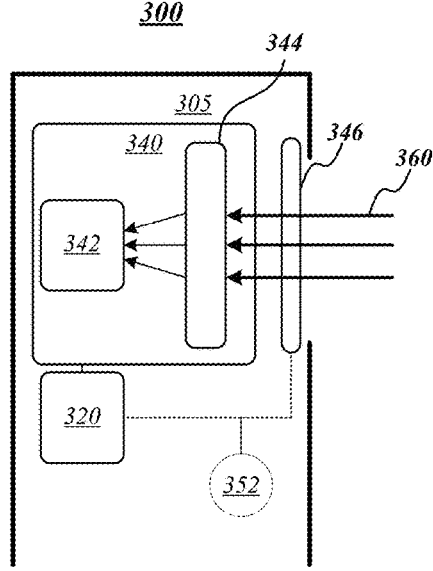
FIG. 3A-C illustrate an embodiment of a third operating environment.
Figure 3B:
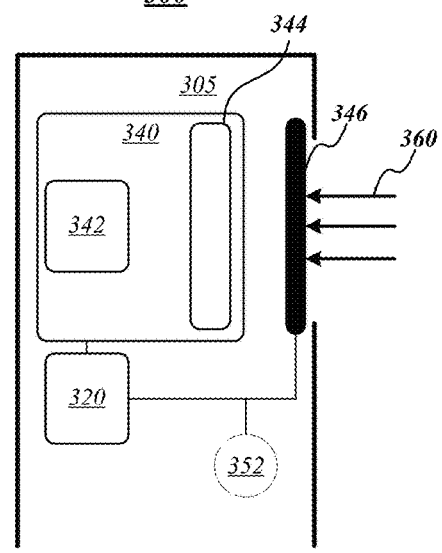
Figure 3C:
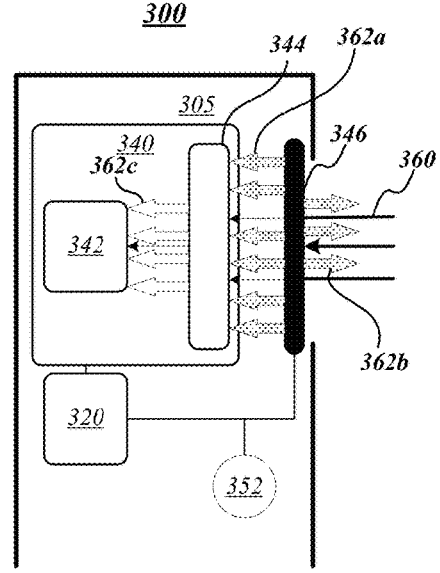

FIG. 3A, FIG. 3B, and FIG. 3C illustrate an example of an operating environment 300 that may be representative of various embodiments. The operating environment 300 depicted in FIG. 3A may include in image capture unit 340 having a lens assembly 344 and in image sensor 342. A privacy assembly 346 may be arranged between lens assembly 344 and incident light 360. A privacy active signal 352 may be low such that privacy assembly 346 is inactive and, therefore transparent or transmissive. Accordingly, incident light 360 may be incident on lens assembly 344 for processing and providing to image sensor 342 to generate a clear image.

Referring to FIG. 3B, privacy active signal 352 may be high such that privacy assembly 346 is active to prevent image capture unit from capturing clear images. In some embodiments, privacy layer assembly may be non-transmissive such that some, all, or substantially all incident light 360 is blocked from being incident on lens assembly 344. Accordingly, if image capture unit 340 were active, image capture unit 340 would not be able to generate clear images as incident light 360 is blocked from being incident on lens assembly 344 and, ultimately, image sensor 342 cannot receive light information sufficient to generate a clear image.

In FIG. 3C, privacy active signal 352 may be high such that privacy assembly 346 is active to prevent image capture unit from capturing clear images. In the configuration depicted in FIG. 3C, privacy assembly 346 includes a light emitting component operative to emit light (see, for example, FIG. 4) 362a, 362b (for example, "blinding light" or "blocking light"). Blinding light 362a may be incident on lens assembly 344, causing lens assembly 344 to include blinding light information 362c to image sensor 342. Accordingly, image sensor 342 will attempt to generate an image based on blinding light information 362c (plus any of incident light 360 that is incident on lens assembly). Any images generated by image sensor 342 while privacy assembly 346 is active will not be clear, as the blinding light information 362 will interfere with any natural incident light 360. For example, Images generated by image sensor 342 while privacy assembly 346 is active will be oversaturated with light, washed out, and/or the like. Accordingly, objects in such images will not be visible or clearly visible.

As shown in FIG. 3C, certain of blinding light 362c may be projected from privacy assembly 346 in a direction away from the apparatus 305 (in an opposite direction of lens assembly 344) toward a user of apparatus 306. Blinding light 362c may be used as light-based privacy indicator, for example, providing an indication that privacy assembly 346 is active (see, for example, FIGS. 4 and 5).

FIG. 4 illustrates an example of an operating environment 400 that may be representative of various embodiments. The operating environment 400 depicted in FIG. 4 may include an apparatus 405 having an image capture unit 440 arranged therein. Image capture unit 440 may include a lens assembly 444 and a privacy assembly 446. As shown in FIG. 4, a privacy assembly 446 may be arranged between lens assembly 444 and incident light 460 external to apparatus 405.

Privacy assembly 446 may include a plurality of layers, such as a blinding layer 474, a transparency layer 472, and/or an information layer 474. In some embodiments, blinding layer 474, transparency layer 472, and/or information layer 474 may be separate layers. In various embodiments, one or more of blinding layer 474, a transparency layer 472, and/or an information layer 474 may be combined into a single layer.

In exemplary embodiments, blinding layer 470 may emit blinding or blocking light. For example, blinding layer 470 may include a layer, film, or other structure that includes liquid crystals, LEDs, organic LEDs (OLEDs), and/or the like. The blinding light may be of various types of light in the visible spectrum and/or other spectrums. Blinding light may be used to blind other aspects of image capture unit, such as depth finding technology (for instance, Intel® RealSense™), night vision technology, object recognition technology, and/or the like. In some embodiments, blinding layer 470 may be formed of a plurality of layers, for instance, emitting light in different spectrums, wavelengths (or colors), intensities, and/or the like. In various embodiments, blinding layer 470 may operate to directly emit light from a surface (for instance, such as with an OLED), an electroluminescent Quantum-Dots, an array of LEDs, or be edge-lit/back-lit in a manner similar to an LED monitor with LED backlighting. Light emitted by blinding layer 470 may be incident on lens assembly 444 to interfere with lens assembly 444 providing clear light input to an image sensor (not shown) of image capture unit 440.

Transparency layer 472 may include a material operative to change transmissivity or transparency and/or incident light wavelengths passing through transparency layer responsive to a stimulus. In this manner, the intensity of blinding light generated by blinding layer 470 that is directed externally from apparatus 405 (for example, from blinding layer 470 toward a user of apparatus 405) may be reduced. For example, blinding layer 470 may generate a blinding light that has a greater intensity than desired by a user. However, such an intensity of the blinding light may be preferred to sufficiently blind lens assembly 444. Accordingly, the intensity of blinding light directed toward lens assembly 444 is not reduced, while the intensity of blinding light exiting apparatus may be reduced or completely eliminated by transparency layer 472.

In some embodiments, transparency layer 472 may include a liquid crystal or "smart glass" material operative to change characteristics in response to a stimulus, such as a voltage, light (for example, from blinding layer 470), and/or the like. Characteristics may include transmissivity, reflected wavelength (or color), and/or the like. For example, the blinding light emitted from blinding layer 470 may have a first intensity and/or first wavelength (or color) in a direction that is incident on lens assembly 444. The blinding light may pass through transparency layer 472 on a path from blinding layer 470 and out of apparatus 405, which may have a second intensity (for instance, lower intensity compared with the first intensity) and/or second wavelength caused by transparency layer 472.

Information layer 474 may be operative to provide a privacy indicator for notification to a user that privacy assembly 446 is active (see, for example, FIG. 5). Information layer 474 may be formed from various materials, such as liquid crystal, LEDs, thin-film-transistors (TFTs), in-plane switching (IPS), and/or the like. For example, a symbol 462 may be imprinted on information layer 474, which may be visible when backlight via light emitted from blinding layer 470. Accordingly, in some embodiments, light emitted by blinding layer 470 may blind image capture unit 440 and backlight symbol 462 of notification layer 474. In some embodiments, transparency layer 472 may operate as an optical barrier or filter for blinding light exiting apparatus 405.

Figure 5A:
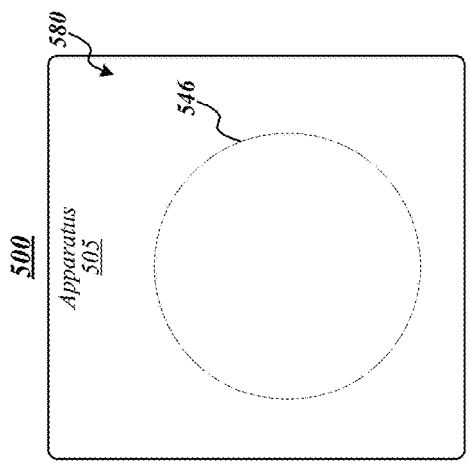
FIG. 5A-C illustrates an embodiment of a fifth operating environment.
Figure 5B:
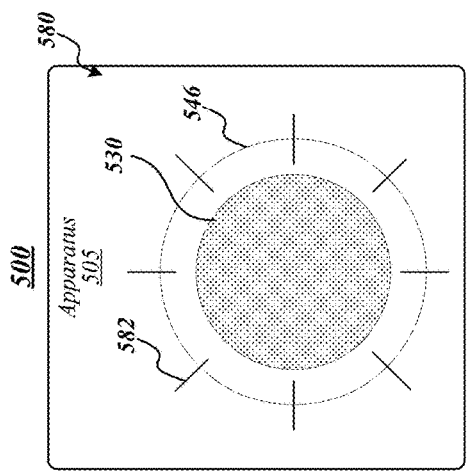
Figure 5C:
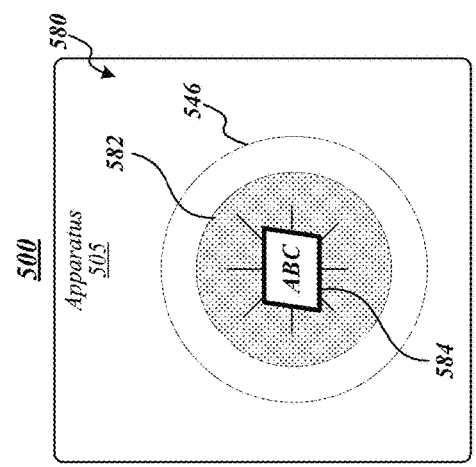

FIG. 5A, FIG. 5B, and FIG. 5C illustrates an example of an operating environment 400 that may be representative of various embodiments. The operating environment 500 depicted in FIG. 5 may include an apparatus 505 having a camera area 570 (for instance, an area of a computing device providing an interface for a camera lens to allow a camera to capture images). A privacy assembly 546 may be arranged over a lens (not shown) operative to receive incident light to facilitate generating an image. In the configuration depicted in FIG. 5A, privacy assembly 546 is inactive and, therefore, invisible or substantially invisible to a user of apparatus 505.

Referring to FIG. 5B, privacy assembly 546 is active. If privacy assembly 546 is active, a user may see a privacy indicator in the form of light 582 being emitted by privacy layer assembly. For example, the camera lens area 5809 of apparatus may appear to emit a certain color light (for instance, blue, yellow, red, white, and/or the like) indicating that privacy assembly 546 is active. In FIG. 5C, privacy assembly 546 is active and projecting a privacy indicator in the form of a symbol or text formed from blinding light 362c, such as the term "privacy" or a logo. Embodiments are not limited in this context.

Figure 6:
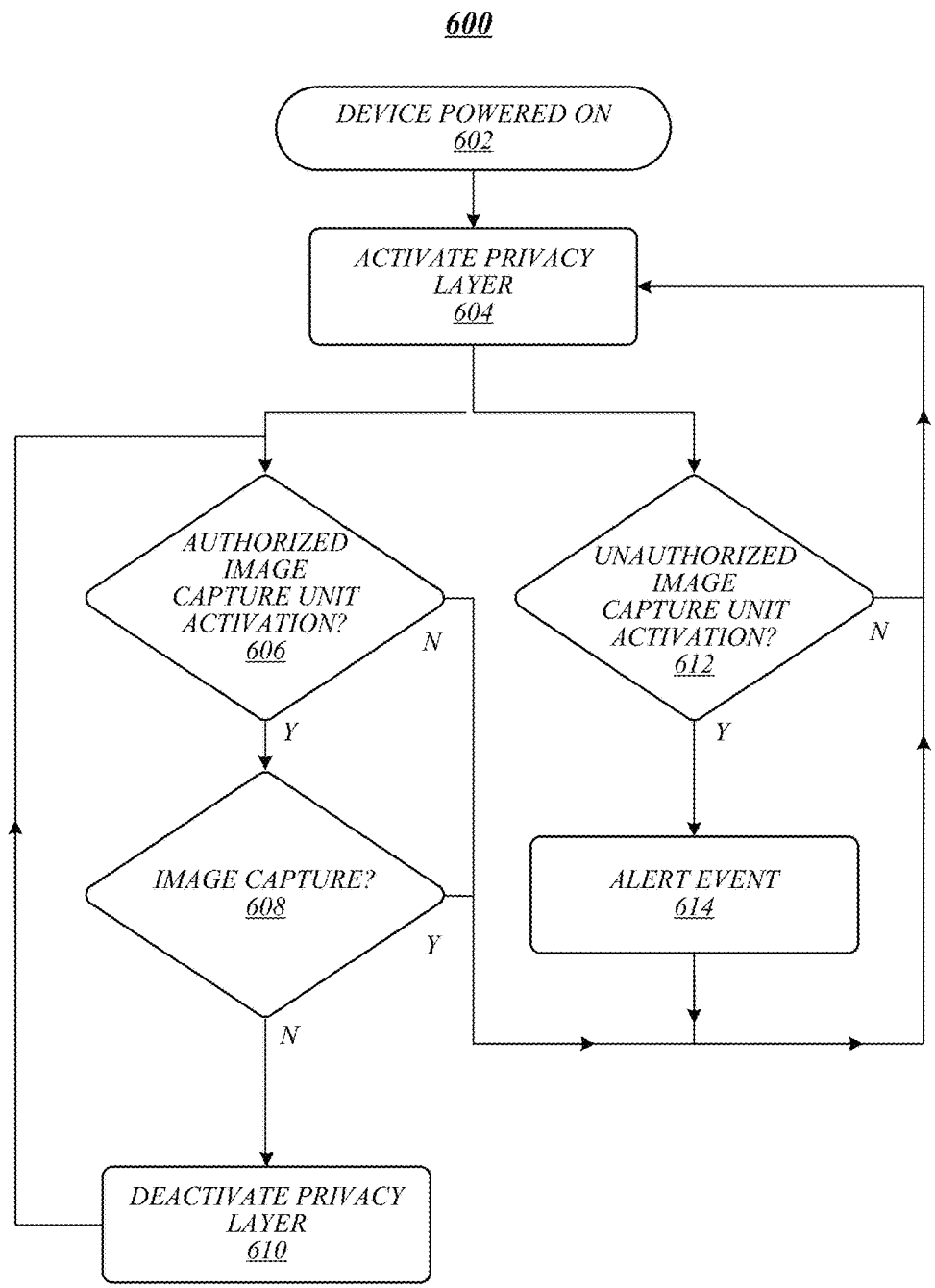
FIG. 6 illustrates an embodiment of a first logic flow.

FIG. 6 illustrates an embodiment of a logic flow 600. Logic flow 600 may be representative of some or all of the operations executed by one or more embodiments described herein, such as apparatus 105, 205, 305, 405, and/or 505. In some embodiments, logic flow 600 may be representative of some or all of the operations of a performance analysis process.

At block 602, a device may be powered on. For example, apparatus 105 in the form of a smart phone may be powered on by a user. At block 604, logic flow may activate a privacy layer. For example, privacy layer 146 may be activated by image capture logic 120. Logic flow 600 at block 606 may determine authorized image capture unit activation. For example, image capture logic 120 may determine whether image capture unit 104 has been activated by an authorized user, such as via a camera interface application or a physical button of apparatus 105. If authorized image capture unit activation has been detected, logic flow 600 may determine whether an image has been captured by an image capture device at block 608. If an image has been captured, logic flow 600 may deactivate privacy layer at block 610. For example, image capture logic 220 may reset a privacy active signal 252. Alternatively, if authorized image capture unit activation has not been detected and/or an image has been captured, logic flow 600 may activate privacy layer at block 604. Accordingly, in some embodiments, decision making regarding activation/deactivation of a privacy layer may involve at least two signals, "start of authorized image capture" (for instance, block 606) and "end of authorized image capture" (for instance, block 608). If a "start of authorized image capture" signal is received, for example, by logic flow 600 or image capture logic 120, the privacy layer may be deactivated. If an "end of authorized image capture" signal is received, the privacy layer may be activated.

In some embodiments, logic flow 600 may determine unauthorized image capture unit activation at block 612. For example, image capture logic 120 may determine that image capture unit 140 was activated by unauthorized means, indicating, for example, malware activation. If logic flow 600 determines unauthorized image capture unit activation, logic flow 600 may generate an alert at block 614 (for example, presenting an alert window or banner on a display device) and activate privacy layer at 604.

Figure 7:
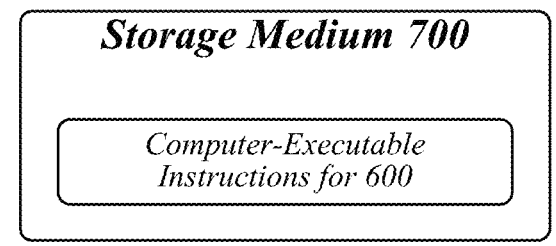
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
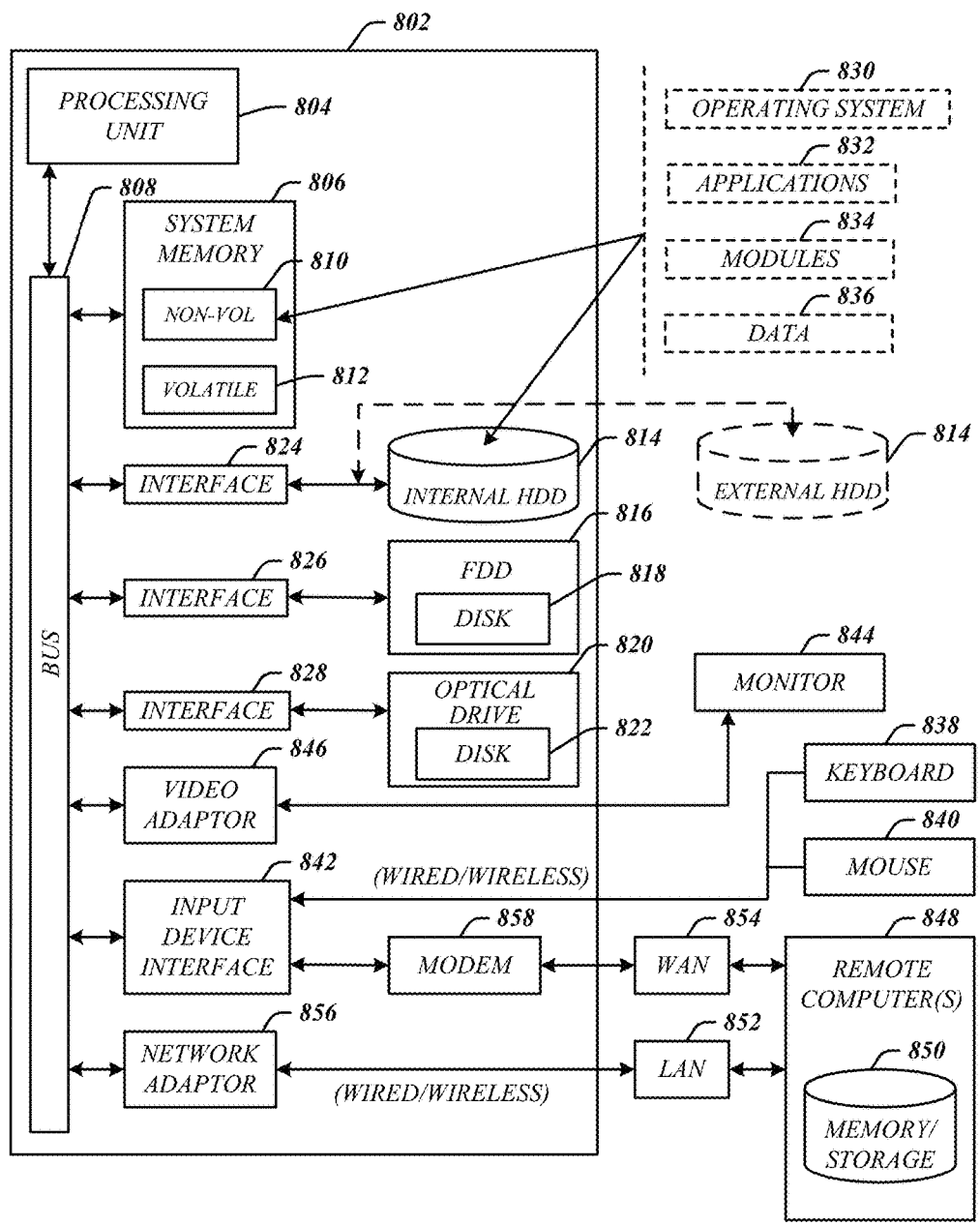
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of apparatus 105, 205, 305, 405, and/or 505. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of apparatus 85, 205, and/or 305.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1384 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus, comprising an image capture unit operative to capture images from incident light incident on at least a portion of the image capture unit, a privacy assembly operative to prevent the image capture unit from generating a clear image responsive to a privacy active signal, and logic coupled to the privacy assembly, the logic to generate the privacy active signal responsive to the image capture unit being inactive.

Example 2 is the apparatus of Example 1, the privacy assembly operative to prevent the image capture unit from generating a clear image by blocking the incident light from reaching a lens assembly of image capture unit.

Example 3 is the apparatus of Example 1, the privacy assembly operative to prevent the image capture unit from generating a clear image by emitting a blinding light operative to interfere with the incident light that reaches a lens assembly of the image capture unit.

Example 4 is the apparatus of Example 1, the privacy assembly operative to present a privacy indicator indicating that the privacy assembly is active.

Example 5 is the apparatus of Example 1, the privacy assembly comprising a blinding layer operative to emit a blinding light.

Example 6 is the apparatus of Example 1, the privacy assembly comprising a blinding layer operative to emit a blinding light, the blinding layer comprising at least one of liquid crystals or light emitting diodes.

Example 7 is the apparatus of Example 1, the privacy assembly comprising a blinding layer operative to emit a blinding light and a transparency layer operative to reduce an intensity of the blinding light in a direction away from the image capture unit.

Example 8 is the apparatus of Example 1, the privacy assembly comprising a blinding layer operative to emit a blinding light and an information layer operative to present a privacy indicator using the blinding light.

Example 9 is the apparatus of Example 1, the privacy assembly comprising a blinding layer operative to emit a blinding light and an information layer operative to present a privacy indicator using the blinding light, the privacy indicator comprising at least one of a light or a symbol.

Example 10 is the apparatus of Example 1, the privacy assembly comprising an information layer comprising at least one of a liquid crystal material, a light emitting diode (LED) material, a thin-film-transistors (TFT) material, and in-plane switching (IPS) material.

Example 11 is the apparatus of Example 1, the privacy assembly comprising an information layer, a blinding layer, and a transparency layer.

Example 12 is the apparatus of Example 1, the privacy layer comprising a blinding layer comprising at least one of light emitting diodes (LEDs), organic LEDs (OLEDs), a liquid crystal display (LCD), or a polymer-dispersed LCD (PDLC).

Example 13 is the apparatus of Example 1, the logic to reset the privacy active signal to deactivate the privacy assembly responsive to the image capture unit capturing an image.

Example 14 is a system, comprising the apparatus according to any of claims 1-13, and at least one network interface.

Example 15 is a method of manufacturing an image capture apparatus, comprising providing an image capture unit operative to capture images from incident light incident on at least a portion of the image capture unit, providing a privacy assembly operative to prevent the image capture unit from generating a clear image responsive to a privacy active signal, and providing logic coupled to the privacy assembly, the logic to generate the privacy active signal responsive to the image capture unit being inactive.

Example 16 is the method of Example 15, configuring the privacy assembly to prevent the image capture unit from generating a clear image by blocking the incident light from reaching a lens assembly of image capture unit.

Example 17 is the method of Example 15, configuring the privacy assembly to prevent the image capture unit from generating a clear image by emitting a blinding light operative to interfere with the incident light that reaches a lens assembly of the image capture unit.

Example 18 is the method of Example 15, configuring the privacy assembly to present a privacy indicator indicating that the privacy assembly is active.

Example 19 is the method of Example 15, the privacy assembly comprising a blinding layer operative to emit a blinding light.

Example 20 is the method of Example 15, the privacy assembly comprising a blinding layer operative to emit a blinding light, the blinding layer comprising at least one of liquid crystals or light emitting diodes.

Example 21 is the method of Example 15, the privacy assembly comprising a blinding layer operative to emit a blinding light and a transparency layer operative to reduce an intensity of the blinding light in a direction away from the image capture unit.

Example 22 is the method of Example 15, the privacy assembly comprising a blinding layer operative to emit a blinding light and an information layer operative to present a privacy indicator using the blinding light.

Example 23 is the method of Example 15, the privacy assembly comprising a blinding layer operative to emit a blinding light and an information layer operative to present a privacy indicator using the blinding light, the privacy indicator comprising at least one of a light or a symbol.

Example 24 is the method of Example 15, the privacy layer comprising an information layer comprising at least one of a liquid crystal material, a light emitting diode (LED) material, a thin-film-transistors (TFT) material, and in-plane switching (IPS) material.

Example 25 is the method of Example 15, the privacy assembly comprising an information layer, a blinding layer, and a transparency layer.

Example 26 is the method of Example 15, the privacy layer comprising a blinding layer comprising at least one of light emitting diodes (LEDs), organic LEDs (OLEDs), a liquid crystal display (LCD), or a polymer-dispersed LCD (PDLC).

Example 27 is the method of Example 15, comprising configuring the logic to reset the privacy active signal to deactivate the privacy assembly responsive to the image capture unit capturing an image.

Example 28 is a non-transitory computer-readable storage medium that stores computer-executable instructions for execution by processing circuitry of a computing device, the computer-executable instructions, when executed, to cause the computing device to capture images from incident light incident on at least a portion of an image capture unit of the computing device, prevent the image capture unit from generating a clear image via a privacy assembly responsive to a privacy active signal, and generate the privacy active signal responsive to the image capture unit being inactive.

Example 29 is the non-transitory computer-readable storage medium of Example 28, the computer-executable instructions, when executed, to cause the computing device to operate the privacy assembly to prevent the image capture unit from generating a clear image by blocking the incident light from reaching a lens assembly of image capture unit.

Example 30 is the non-transitory computer-readable storage medium of Example 28, the computer-executable instructions, when executed, to cause the computing device to operate the privacy assembly to prevent the image capture unit from generating a clear image by emitting a blinding light operative to interfere with the incident light that reaches a lens assembly of the image capture unit.

Example 31 is the non-transitory computer-readable storage medium of Example 28, the computer-executable instructions, when executed, to cause the computing device to operate the privacy assembly to present a privacy indicator indicating that the privacy assembly is active.

Example 32 is the non-transitory computer-readable storage medium of Example 28, the privacy assembly comprising a blinding layer operative to emit a blinding light.

Example 33 is the non-transitory computer-readable storage medium of Example 28, the privacy assembly comprising a blinding layer operative to emit a blinding light, the blinding layer comprising at least one of liquid crystals or light emitting diodes.

Example 34 is the non-transitory computer-readable storage medium of Example 28, the privacy assembly comprising a blinding layer operative to emit a blinding light and a transparency layer operative to reduce an intensity of the blinding light in a direction away from the image capture unit.

Example 35 is the non-transitory computer-readable storage medium of Example 28, the privacy assembly comprising a blinding layer operative to emit a blinding light and an information layer operative to present a privacy indicator using the blinding light.

Example 36 is the non-transitory computer-readable storage medium of Example 28, the privacy assembly comprising a blinding layer operative to emit a blinding light and an information layer operative to present a privacy indicator using the blinding light, the privacy indicator comprising at least one of a light or a symbol.

Example 37 is the non-transitory computer-readable storage medium of Example 28, the privacy assembly comprising an information layer comprising at least one of a liquid crystal material, a light emitting diode (LED) material, a thin-film-transistors (TFT) material, and in-plane switching (IPS) material.

Example 38 is the non-transitory computer-readable storage medium of Example 28, the privacy assembly comprising an information layer, a blinding layer, and a transparency layer.

Example 39 is the non-transitory computer-readable storage medium of Example 28, the privacy layer comprising a blinding layer comprising at least one of light emitting diodes (LEDs), organic LEDs (OLEDs), a liquid crystal display (LCD), or a polymer-dispersed LCD (PDLC).

Example 40 is the non-transitory computer-readable storage medium of Example 28, the computer-executable instructions, when executed, to cause the computing device to reset the privacy active signal to deactivate the privacy assembly responsive to the image capture unit capturing an image.

Example 41 is an apparatus, comprising an image capture means operative to capture images from incident light incident on at least a portion of the image capture unit, a privacy means operative to prevent the image capture unit from generating a clear image responsive to a privacy active signal, and privacy controller means coupled to the privacy assembly, the privacy controller means to generate the privacy active signal responsive to the image capture unit being inactive.

Example 42 is the apparatus of Example 1, the privacy means operative to prevent the image capture unit from generating a clear image by blocking the incident light from reaching a lens assembly of image capture unit.

Example 43 is the apparatus of Example 1, the privacy means operative to prevent the image capture unit from generating a clear image by emitting a blinding light operative to interfere with the incident light that reaches a lens assembly of the image capture unit.

Example 44 is the apparatus of Example 1, the privacy means operative to present a privacy indicator indicating that the privacy assembly is active.

Example 45 is the apparatus of Example 1, the privacy means comprising a blinding layer operative to emit a blinding light.

Example 46 is the apparatus of Example 1, the privacy means comprising a blinding layer operative to emit a blinding light, the blinding layer comprising at least one of liquid crystals or light emitting diodes.

Example 47 is the apparatus of Example 1, the privacy means comprising a blinding layer operative to emit a blinding light and a transparency layer operative to reduce an intensity of the blinding light in a direction away from the image capture unit.

Example 48 is the apparatus of Example 1, the privacy means comprising a blinding layer operative to emit a blinding light and an information layer operative to present a privacy indicator using the blinding light.

Example 49 is the apparatus of Example 1, the privacy means comprising a blinding layer operative to emit a blinding light and an information layer operative to present a privacy indicator using the blinding light, the privacy indicator comprising at least one of a light or a symbol.

Example 50 is the apparatus of Example 1, the privacy means comprising an information layer comprising at least one of a liquid crystal material, a light emitting diode (LED) material, a thin-film-transistors (TFT) material, and in-plane switching (IPS) material.

Example 51 is the apparatus of Example 1, the privacy means comprising an information layer, a blinding layer, and a transparency layer.

Example 52 is the apparatus of Example 1, the privacy means comprising a blinding layer comprising at least one of light emitting diodes (LEDs), organic LEDs (OLEDs), a liquid crystal display (LCD), or a polymer-dispersed LCD (PDLC).

Example 53 is the apparatus of Example 1, the privacy controller means to reset the privacy active signal to deactivate the privacy assembly responsive to the image capture unit capturing an image.

Example 54 is a system, comprising the apparatus according to any of examples 41-53, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    an image capture unit operative to capture images from incident light incident on at least a portion of the image capture unit;
    a privacy assembly comprising a blinding layer operative to emit a blinding light to prevent the image capture unit from generating a clear image responsive to a privacy active signal; and
    logic coupled to the privacy assembly, the logic to generate the privacy active signal responsive to the image capture unit being inactive.

2. The apparatus of claim 1, the privacy assembly operative to prevent the image capture unit from generating a clear image by blocking the incident light from reaching a lens assembly of image capture unit.

3. The apparatus of claim 1, the privacy assembly operative to prevent the image capture unit from generating a clear image by emitting the blinding light operative to interfere with the incident light that reaches a lens assembly of the image capture unit.

4. The apparatus of claim 1, the privacy assembly operative to present a privacy indicator indicating that the privacy assembly is active.

5. The apparatus of claim 1, the blinding layer comprising at least one of liquid crystals or light emitting diodes.

6. The apparatus of claim 1, the privacy assembly comprising a transparency layer operative to reduce an intensity of the blinding light in a direction away from the image capture unit.

7. The apparatus of claim 1, the privacy assembly comprising an information layer operative to present a privacy indicator using the blinding light.

8. The apparatus of claim 1, the privacy assembly comprising an information layer operative to present a privacy indicator using the blinding light, the privacy indicator comprising at least one of a light or a symbol.

9. The apparatus of claim 1, the privacy assembly comprising an information layer comprising at least one of a liquid crystal material, a light emitting diode (LED) material, a thin-film-transistors (TFT) material, and in-plane switching (IPS) material.

10. A method of manufacturing an image capture apparatus, comprising:
    providing an image capture unit operative to capture images from incident light incident on at least a portion of the image capture unit;
    providing a privacy assembly comprising a blinding layer operative to emit a blinding light to prevent the image capture unit from generating a clear image responsive to a privacy active signal; and
    providing logic coupled to the privacy assembly, the logic to generate the privacy active signal responsive to the image capture unit being inactive.

11. The method of claim 10, configuring the privacy assembly to prevent the image capture unit from generating a clear image by blocking the incident light from reaching a lens assembly of image capture unit.

12. The method of claim 10, configuring the privacy assembly to prevent the image capture unit from generating a clear image by emitting the blinding light operative to interfere with the incident light that reaches a lens assembly of the image capture unit.

13. The method of claim 10, configuring the privacy assembly to present a privacy indicator indicating that the privacy assembly is active.

14. The method of claim 10, the blinding layer comprising at least one of liquid crystals or light emitting diodes.

15. The method of claim 10, the privacy assembly comprising a transparency layer operative to reduce an intensity of the blinding light in a direction away from the image capture unit.

16. The method of claim 10, the privacy assembly comprising an information layer operative to present a privacy indicator using the blinding light.

17. The method of claim 10, the privacy assembly comprising an information layer operative to present a privacy indicator the privacy indicator comprising at least one of a light or a symbol.

18. The method of claim 10, the privacy assembly comprising an information layer comprising at least one of a liquid crystal material, a light emitting diode (LED) material, a thin-film-transistors (TFT) material, and in-plane switching (IPS) material.

19. A non-transitory computer-readable storage medium that stores computer-executable instructions for execution by processing circuitry of a computing device, the computer-executable instructions, when executed, to cause the computing device to:

capture images from incident light incident on at least a portion of an image capture unit of the computing device;

prevent the image capture unit from generating a clear image via a privacy assembly responsive to a privacy active signal, the privacy assembly comprising a blinding layer operative to emit a blinding light to prevent the image capture unit from generating a clear image; and generate the privacy active signal responsive to the image capture unit being inactive.

20. The non-transitory computer-readable storage medium of claim 19, the computer-executable instructions, when executed, to cause the computing device to cause the privacy assembly operative to prevent the image capture unit from generating a clear image by blocking the incident light from reaching a lens assembly of image capture unit.

21. The non-transitory computer-readable storage medium of claim 19, the computer-executable instructions, when executed, to cause the computing device to cause the privacy assembly operative to prevent the image capture unit from generating a clear image by emitting a blinding light operative to interfere with the incident light that reaches a lens assembly of the image capture unit.

22. The non-transitory computer-readable storage medium of claim 19, the computer-executable instructions, when executed, to cause the computing device to cause the privacy assembly operative to present a privacy indicator indicating that the privacy assembly is active.

* * * * *